(No Model.)
J. F. KELLY.
ELECTRICAL METER.
No. 472,265. Patented Apr. 5, 1892.
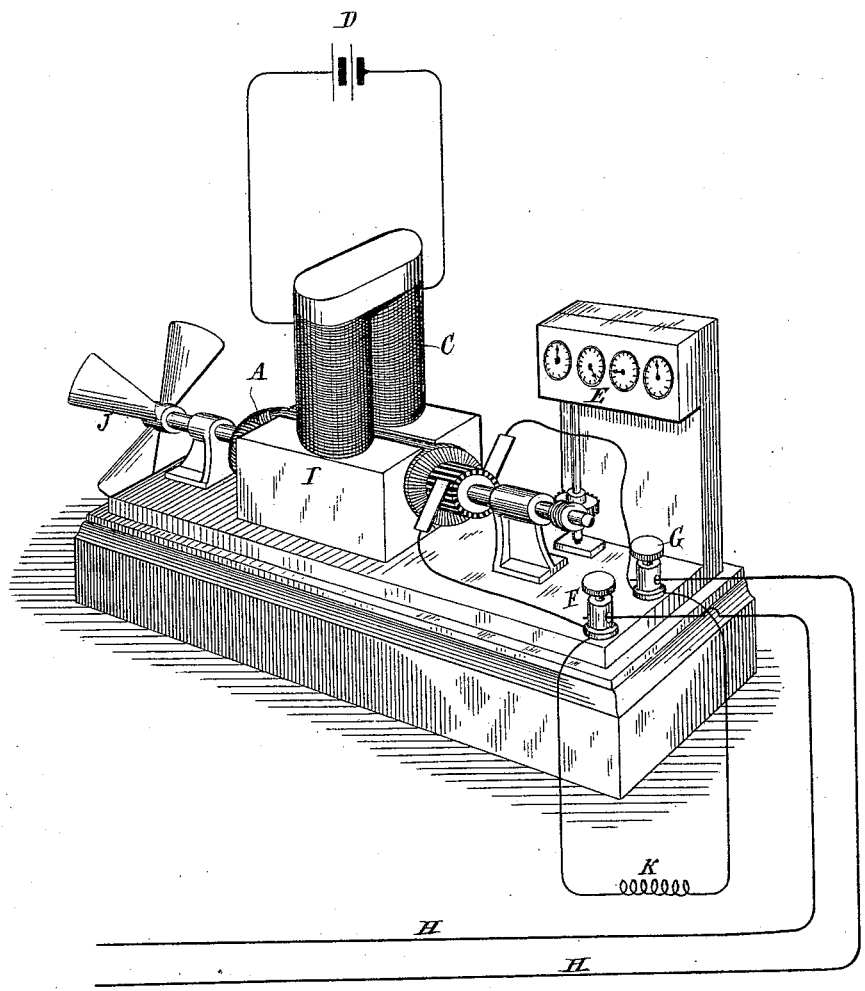
Witnesses:
Raphaël Netter
Frank B. Murphy.
Inventor
John F. Kelly
by
Duncan & Page
Attorneys

UNITED STATES PATENT OFFICE.

JOHN F. KELLY, OF NEW YORK, N. Y.

ELECTRICAL METER.

SPECIFICATION forming part of Letters Patent No. 472,265, dated April 5, 1892.

Application filed August 18, 1891. Serial No. 402,980. (No model.)

*To all whom it may concern:*

Be it known that I, JOHN F. KELLY, a citizen of the United States, residing at New York, in the county and State of New York, have invented certain new and useful Improvements in Electrical Meters, of which the following is a specification, reference being had to the drawing accompanying and forming a part of the same.

My invention consists in a coulomb meter—that is to say, an electrical meter for registering and indicating the quantity of electricity which has passed through a circuit in a given time.

The nature of the invention will be understood from the following:

The speed of rotation of an electro-magnetic motor working under a constant load and assuming the magnetic strength of the field to remain constant is proportional to E E′, in which E is the impressed electro-motive force and E′ that electro-motive force which is just sufficient to produce motion. On the other hand, and with the same conditions of constant field, if the load varies directly as the speed the latter will vary directly as E, the impressed electro-motive force, since in this case the loss of electro-motive force, represented by the product of the current and resistance, is also directly proportional to E. The law of the speed of any motor with a constant field and working under a load intermediate in character or one not varying as much as the speed would lie between these two; but the value of E′ may be made very small by reducing the initial friction of the bearings and brushes and increasing the strength of the field, and, moreover, its importance in any event is rapidly reduced as the electro-motive force rises, particularly when a part of the load varies with the speed. It is evident therefore that a motor with a strong and constant field, in which the initial friction and mechanical resistance to rotation is reduced to a minimum, might be used to integrate the electro-motive force supplied to a circuit. Such a motor I propose to utilize as a coulomb meter by providing it with a registering-train and shunting it by a path of such low resistance that the difference of potential at its terminals will be practically determined by the shunt alone. Under such conditions the electro-motive force on the motor would be directly proportional to the current in the circuit.

Inasmuch as in a constant-field motor loaded with a device of which the torque varies directly as the speed, the speed, the impressed electro-motive force, and the current all vary together, it is evident that such a motor so loaded could be directly used as a coulomb meter; but it is impossible to make the load entirely of this character, and it would be very difficult to carry large currents through the commutator of such a motor as would necessarily be used for a meter. These objections are not present in the shunted meter above described.

In carrying out the invention I employ a motor with a permanent magnet for the field or an electro-magnet excited by a separate source of current, or in cases where the instrument is used with a constant-potential circuit the field-coils might be included in a separate branch of the circuit. For the main load I use a fan or a metal disk moving through a magnetic field, or any other contrivance in which the torque is proportional to the speed and the work to the square of the speed.

In the drawing I have represented a motor comprising an armature A and a field-magnet B, the latter being wound with energizing-coils C in the circuit of a source of current D. In gear with the armature is a registering-train E, that indicates coulombs or units of quantity. The armature-coils are connected by the brushes to terminals F G, which are shunted by a conductor K of low resistance, as above set forth. The motor is inserted in the circuit or branch of a circuit H, in which the quantity of current that passes in a given time is to be measured. On the armature-shaft is shown a fan J, which is the load under which the motor works.

I am aware that motor-meters have been shunted, but not, so far as I am aware, with the same purpose as I have in view and not with shunts of the same character, nor have such motors had a constant field and used under conditions that rendered possible the attainment of the results which I secure.

What I claim is—

1. A coulomb meter consisting in the combination, with a motor having a constant field, of a shunt or path of low resistance around the terminals of the motor, whereby the difference of potential at the terminals will be determined by the shunt, a load consisting of such a device as a fan, and means for indicating or registering the revolutions of the shaft.

2. The combination, with a circuit in which the quantity of electricity passing in a given time is to be measured, of an electro-magnetic motor having a constant field and connected in or with the said circuit, a shunt of low resistance around the motor, a fan or like device driven by the shaft, and a registering-train in gear with the shaft, as set forth.

JOHN F. KELLY.

Witnesses:
REGINALD A. FESSENDEN,
PARKER W. PAGE.